United States Patent
Barthur et al.

(10) Patent No.: US 10,938,877 B2
(45) Date of Patent: Mar. 2, 2021

(54) OPTIMIZING DATA TRANSMISSION PARAMETERS OF A PROPRIETARY NETWORK

(71) Applicant: Xaptum, Inc., Chicago, IL (US)

(72) Inventors: Pradeep Srinivas Barthur, White Plains, NY (US); Rohit Pasam, Chicago, IL (US); Venkatakumar Srinivasan, Chicago, IL (US); Gary W. Grube, Barrington Hills, IL (US)

(73) Assignee: Xaptum, Inc., Chicago, IL (US)

( * ) Notice: Subject to any disclaimer, the term of this patent is extended or adjusted under 35 U.S.C. 154(b) by 0 days.

(21) Appl. No.: 16/692,226

(22) Filed: Nov. 22, 2019

(65) Prior Publication Data

US 2020/0177658 A1 Jun. 4, 2020

Related U.S. Application Data

(60) Provisional application No. 62/773,966, filed on Nov. 30, 2018.

(51) Int. Cl.
*H04L 29/06* (2006.01)
*H04L 12/891* (2013.01)
(Continued)

(52) U.S. Cl.
CPC ........ *H04L 65/607* (2013.01); *H04L 12/4633* (2013.01); *H04L 43/0876* (2013.01);
(Continued)

(58) Field of Classification Search
None
See application file for complete search history.

(56) References Cited

U.S. PATENT DOCUMENTS

| 5,410,475 A | 4/1995 | Lu |
| 5,978,386 A | 11/1999 | Haemaelaeinen |

(Continued)

FOREIGN PATENT DOCUMENTS

| EP | 0931418 A2 | 7/1999 |
| EP | 1856602 A2 | 11/2007 |

(Continued)

OTHER PUBLICATIONS

Handley, et al., SIP: Session Initiation Protocol, Mar. 1999, www.rfc-base.org., RFC2543.

(Continued)

*Primary Examiner* — Lashonda T Jacobs
(74) *Attorney, Agent, or Firm* — Garlick & Markison; Gary W. Grube

(57) ABSTRACT

A method includes a computing entity receiving sets of data streams from local networks. The method further includes de-aggregating and de-packetizing the sets of data streams using aggregating and packetizing protocols to recover sets of sets of raw data elements. The method further includes, for a user computing device, selecting a group of raw data elements from the sets of sets of raw data elements using client data selection criteria. The method further includes aggregating and packetizing the group of raw data elements in accordance with a network aggregating and packetizing protocol to produce a client data packet and transmitting the client data packet to the user computing device.

18 Claims, 10 Drawing Sheets

(51) Int. Cl.
  *H04L 12/46* (2006.01)
  *H04L 12/26* (2006.01)
(52) U.S. Cl.
  CPC ............ *H04L 47/41* (2013.01); *H04L 65/608* (2013.01); *H04L 69/163* (2013.01)

(56) References Cited

U.S. PATENT DOCUMENTS

| | | | |
|---|---|---|---|
| 6,097,794 A | 8/2000 | Suffern | |
| 6,430,184 B1 | 8/2002 | Robins | |
| 6,651,099 B1 | 11/2003 | Dietz | |
| 6,661,431 B1 | 12/2003 | Stuart | |
| 6,667,700 B1 | 12/2003 | McCanne | |
| 6,721,333 B1 | 4/2004 | Milton | |
| 6,859,835 B1 | 2/2005 | Hipp | |
| 7,120,790 B1 | 10/2006 | Lopresti | |
| 7,319,847 B2 | 1/2008 | Xanthos | |
| 7,467,219 B2 * | 12/2008 | Hodges ................... H04L 29/06 375/E7.013 | |
| 7,590,715 B1 | 9/2009 | Raanan | |
| 8,073,973 B2 | 12/2011 | McCann | |
| 8,291,058 B2 | 10/2012 | Head | |
| 8,321,434 B1 | 11/2012 | Ren | |
| 9,887,911 B2 | 2/2018 | Pasam | |
| 2002/0085575 A1 | 7/2002 | Smith | |
| 2002/0176378 A1 | 11/2002 | Hamilton | |
| 2003/0140140 A1 | 7/2003 | Lahtinen | |
| 2004/0128552 A1 | 7/2004 | Toomey | |
| 2005/0005145 A1 | 1/2005 | Teixeira | |
| 2006/0092930 A1 | 5/2006 | Shah | |
| 2006/0126510 A1 | 6/2006 | Russell | |
| 2007/0195780 A1 | 8/2007 | Cabeca | |
| 2008/0115149 A1 | 5/2008 | Rupp | |
| 2009/0063625 A1 | 3/2009 | Bagepalli | |
| 2009/0070779 A1 | 3/2009 | Wang | |
| 2009/0097506 A1 | 4/2009 | Subrahmanyan | |
| 2009/0168760 A1 | 7/2009 | Katis | |
| 2009/0199210 A1 | 8/2009 | Smith, Jr. | |
| 2009/0222590 A1 | 9/2009 | Van Aken | |
| 2009/0268714 A1 * | 10/2009 | Ho ........................ H04L 1/1841 370/352 | |
| 2009/0323703 A1 | 12/2009 | Bragagnini | |
| 2009/0323718 A1 | 12/2009 | Oren-Dahan | |
| 2010/0023524 A1 | 1/2010 | Gladwin | |
| 2010/0023546 A1 * | 1/2010 | Silsby ................... G06F 16/283 707/E17.005 | |
| 2010/0095367 A1 | 4/2010 | Narayanaswamy | |
| 2010/0233961 A1 | 9/2010 | Holden | |
| 2011/0070868 A1 | 3/2011 | Scholz | |
| 2011/0145181 A1 | 6/2011 | Pandya | |
| 2011/0228744 A1 | 9/2011 | Cai | |
| 2011/0264657 A1 | 10/2011 | Hoffman | |
| 2012/0102055 A1 | 4/2012 | Hu | |
| 2012/0120967 A1 | 5/2012 | Ghiasi | |
| 2012/0210426 A1 | 8/2012 | Yu | |
| 2012/0253728 A1 | 10/2012 | Chamas | |
| 2012/0265852 A1 * | 10/2012 | Musta ..................... H04L 69/08 709/218 | |
| 2013/0094451 A1 | 4/2013 | Pavlovski | |
| 2013/0111217 A1 | 5/2013 | Kopasz | |
| 2013/0136127 A1 | 5/2013 | Hill | |
| 2013/0185614 A1 * | 7/2013 | Shen .................. H03M 13/356 714/784 | |
| 2013/0211555 A1 | 8/2013 | Lawson | |
| 2013/0304616 A1 | 11/2013 | Raleigh | |
| 2013/0322626 A1 | 12/2013 | Yang | |
| 2014/0006632 A1 | 1/2014 | Evens | |
| 2014/0028462 A1 | 1/2014 | Lawson | |
| 2014/0280829 A1 | 9/2014 | Kjendal | |
| 2015/0156266 A1 | 6/2015 | Gupta | |
| 2015/0236819 A1 * | 8/2015 | Zhovnirnovsky ..... H04L 1/1819 370/216 | |
| 2016/0119198 A1 | 4/2016 | Kfir | |
| 2016/0119211 A1 * | 4/2016 | King ..................... H04L 47/825 370/252 | |
| 2016/0119238 A1 * | 4/2016 | Jia .......................... H04L 47/36 709/224 | |
| 2016/0210578 A1 | 7/2016 | Raleigh | |
| 2017/0026469 A1 | 1/2017 | Usgaonkar | |
| 2018/0026873 A1 | 1/2018 | Cheng et al. | |
| 2019/0005109 A1 * | 1/2019 | Singhal ................. G06F 16/437 | |
| 2019/0236149 A1 * | 8/2019 | Kuruvada ............ G06Q 10/063 | |

FOREIGN PATENT DOCUMENTS

| | | |
|---|---|---|
| EP | 1446906 B1 | 12/2007 |
| WO | 0049481 A2 | 8/2000 |

OTHER PUBLICATIONS

International Search Report corresponding to International Patent Application Serial No. PCT/US14/19595, United States Patent and Trademark Office, dated Feb. 28, 2014; (4 pages).

International Written Opinion corresponding to International Patent Application Serial No. PCT/US14/19595, United States Patent and Trademark Office, dated Feb. 28, 2014; (5 pages).

* cited by examiner

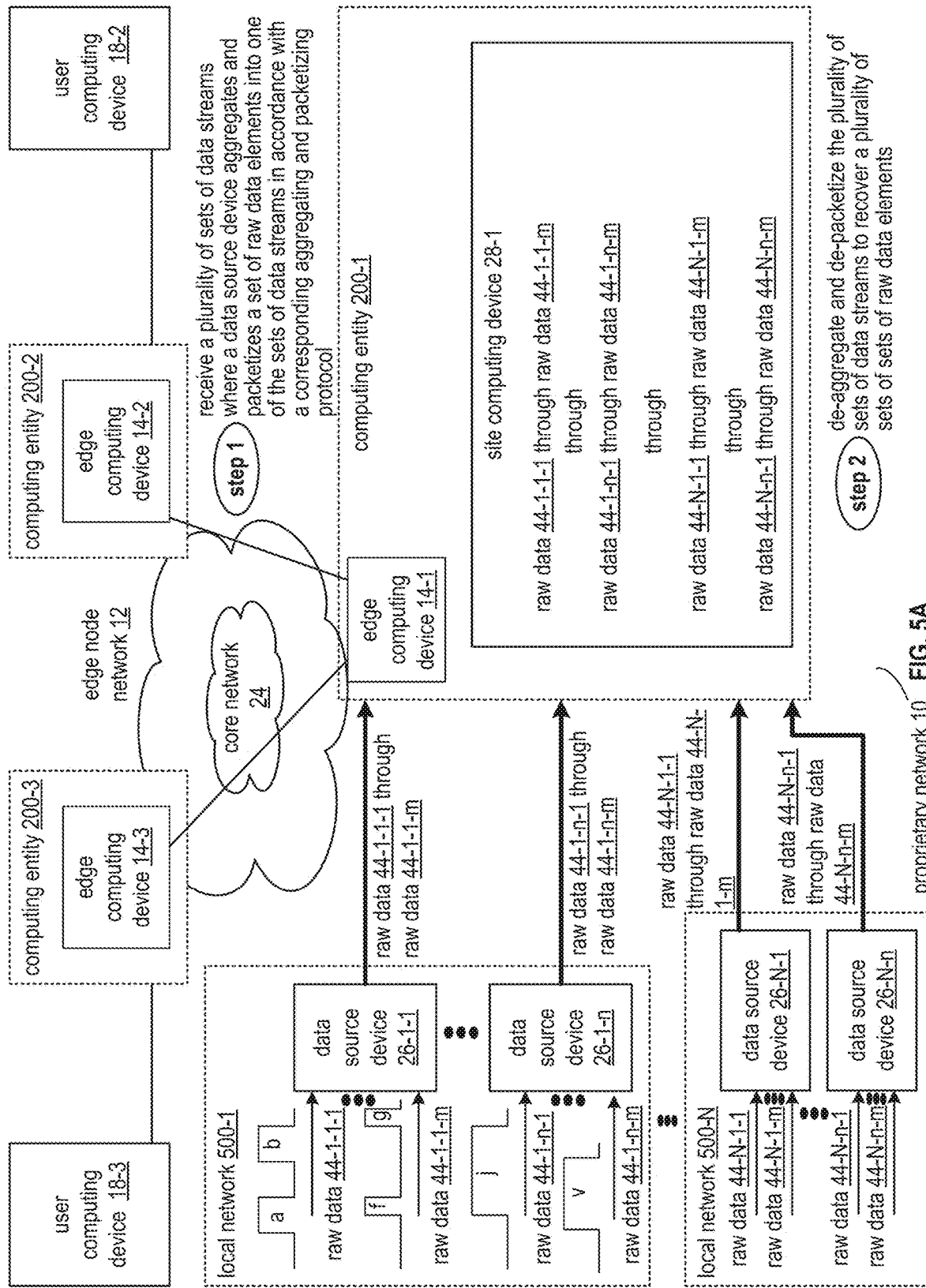

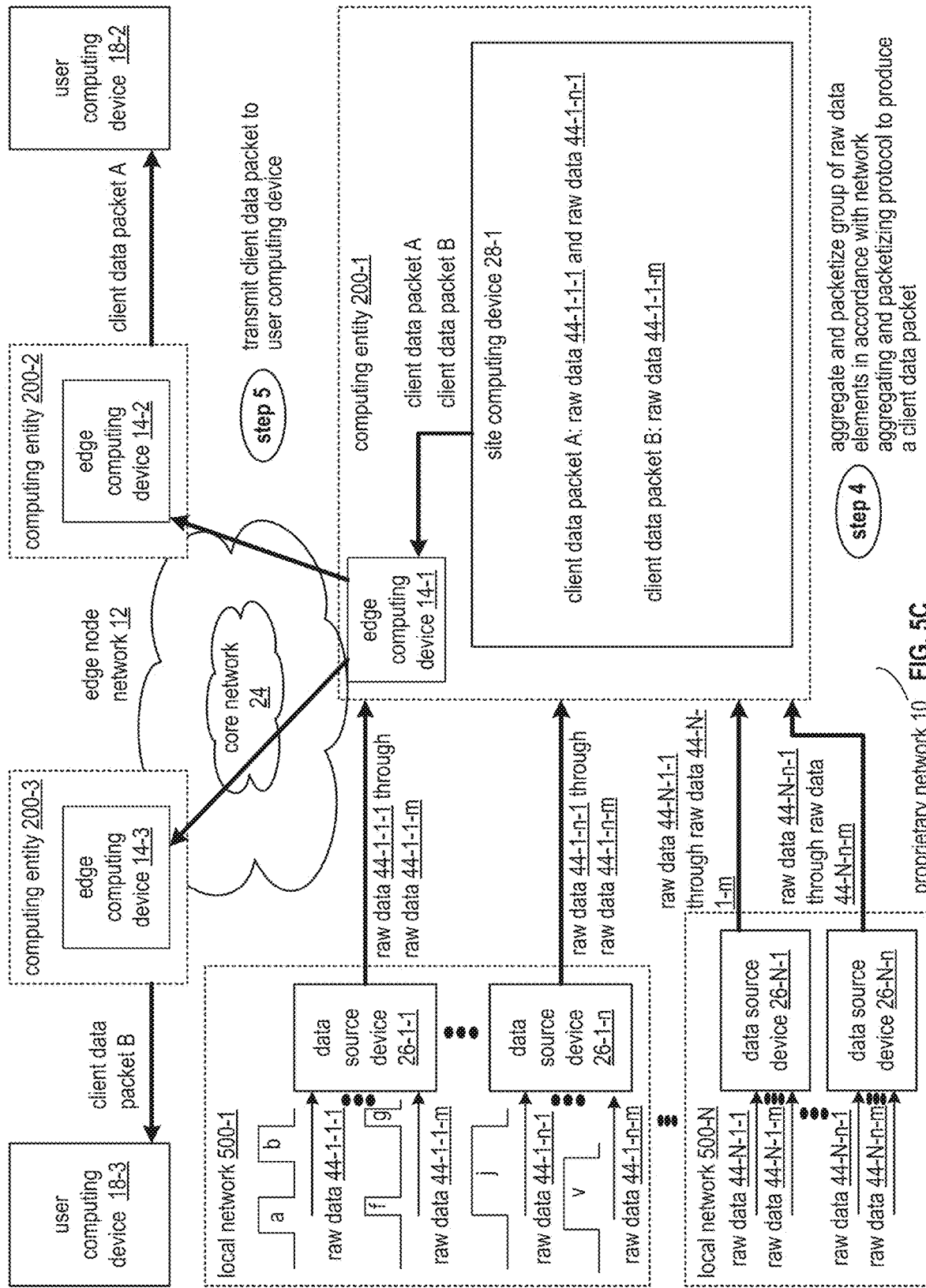

OPTIMIZING DATA TRANSMISSION PARAMETERS OF A PROPRIETARY NETWORK

CROSS REFERENCE TO RELATED PATENTS

The present U.S. Utility Patent application claims priority pursuant to 35 U.S.C. § 119(e) to U.S. Provisional Application No. 62/773,966, entitled "ADAPTIVE PACKET BOUNDARY CONTROL IN A COMMUNICATION SYSTEM," filed Nov. 30, 2018, which is hereby incorporated herein by reference in its entirety and made part of the present U.S. Utility Patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to data communication systems.

Description of Related Art

The use of computers to communicate text files, voice files, multimedia files, and even live data streaming is known. Most computers utilize the Internet protocol (IP) to communicate via the Internet. The Internet protocol is known to be the primary network communications protocol utilized on the Internet, where IP provides a network layer protocol in accordance with one or more industry standards such as transmission control protocol (TCP), user datagram protocol (UDP), and stream control transmission protocol (SCTP).

It is also known for computers to utilize a transport protocol on top of the network layer protocol to transport data between computing devices, where the transport protocol is in accordance with one or more industry standard session protocols such as hypertext transfer protocol (HTTP) and Message queue telemetry transport (MQQT). Further industry standards have resulted in a focus on so-called constrained devices where lower power devices and lossy networks may be joined by the Internet. One such resulting industry standard is the constrained application protocol (CoAP) which provides a service layer protocol over the session protocol HTTP over the network layer protocol UDP. Computers are generally required to understand the protocol and data format from the various devices connected to the same network.

BRIEF DESCRIPTION OF THE SEVERAL VIEWS OF THE DRAWING(S)

Figure 6:
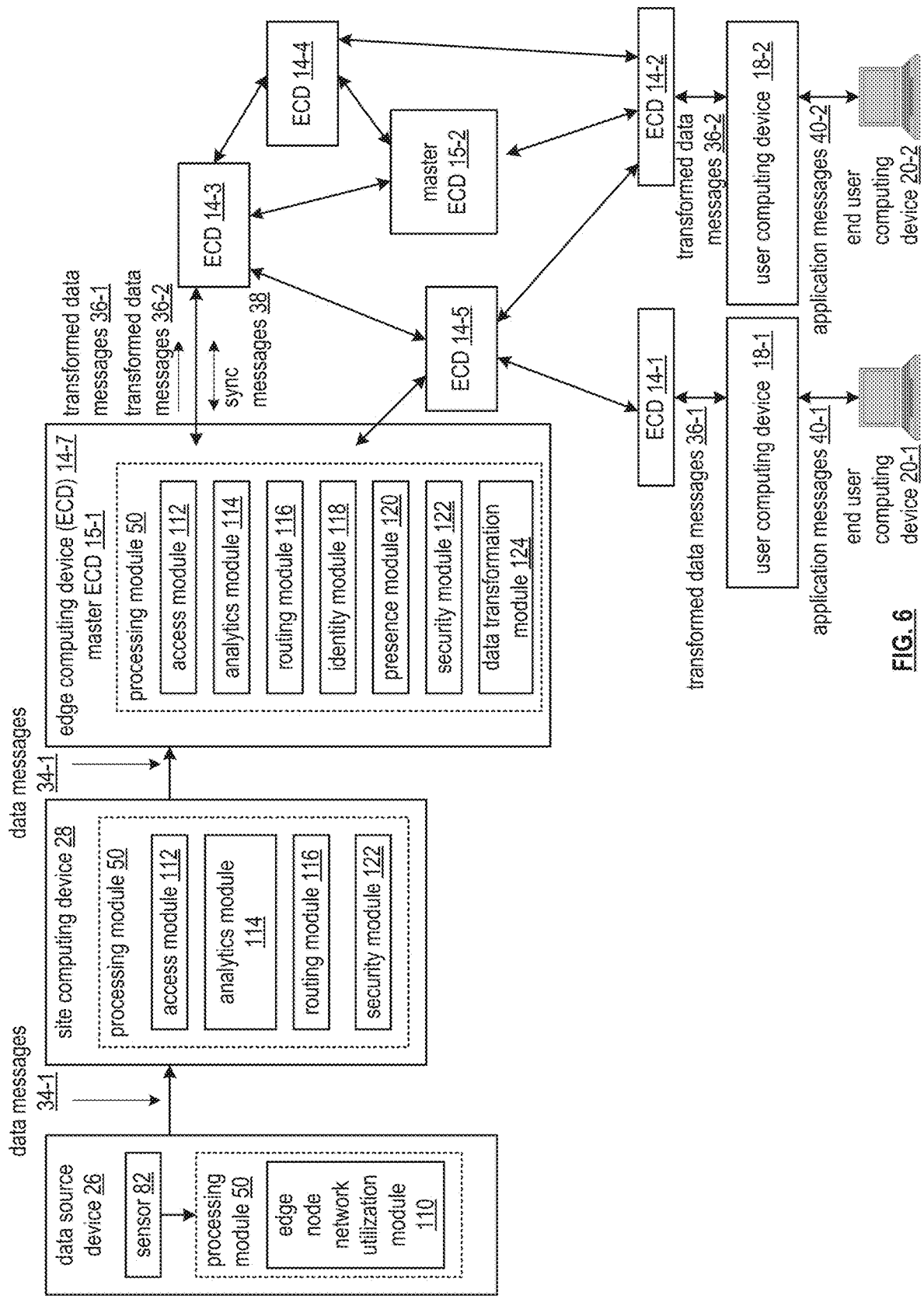
Figure 7A:
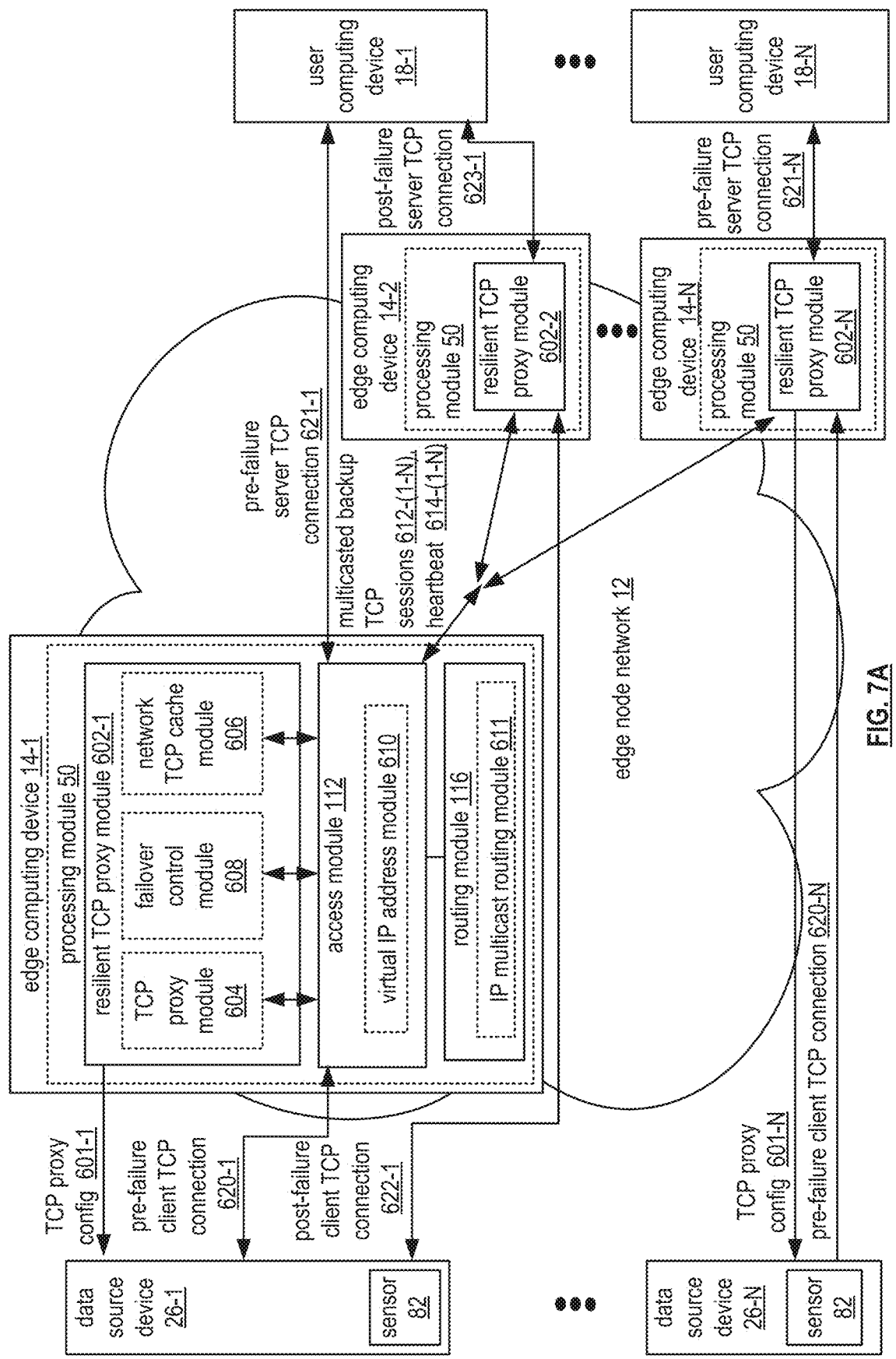
Figure 7B:
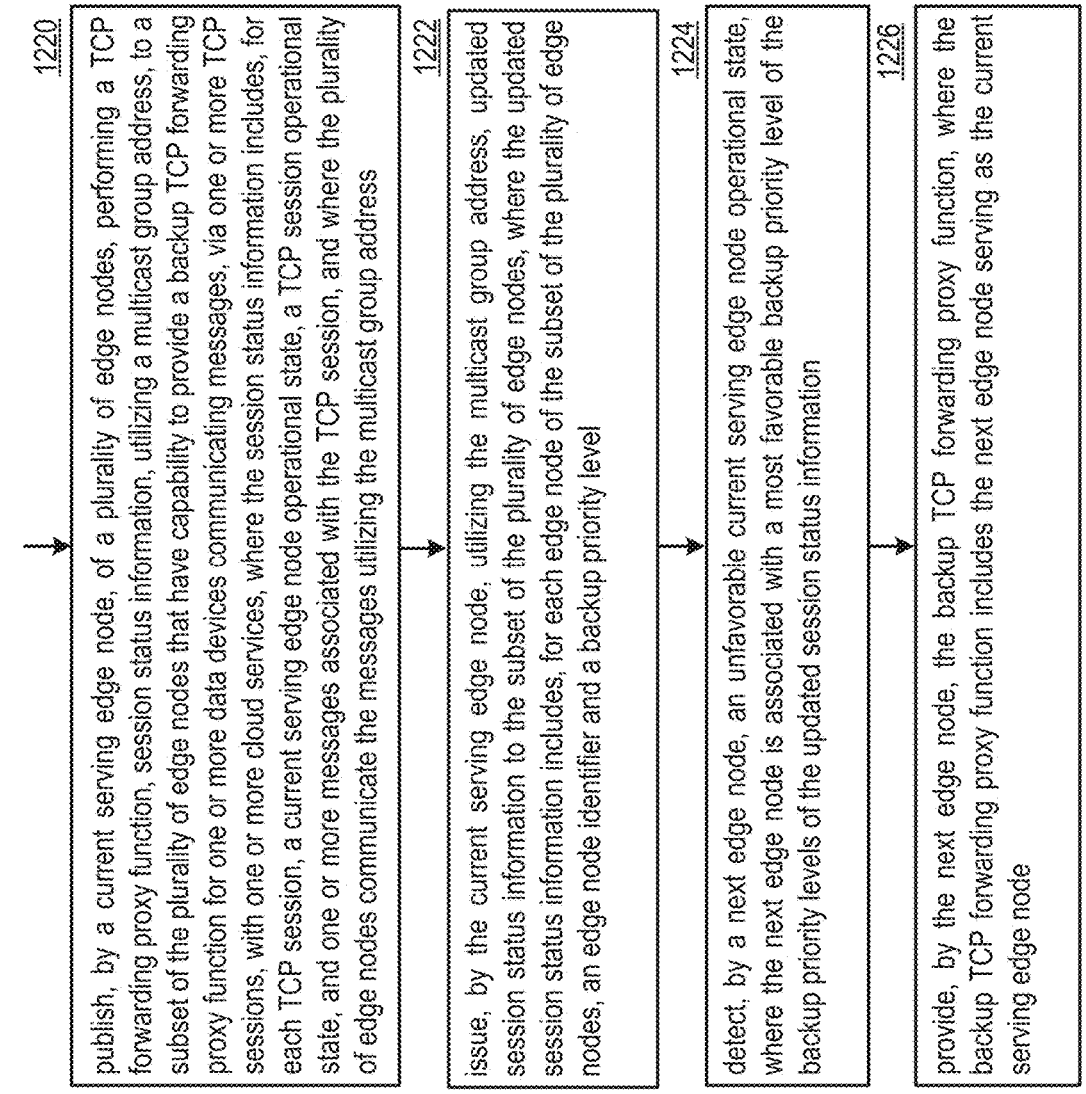

FIGS. 5A, 5B, 5C, and 5D are schematic block diagrams of embodiments of a proprietary network illustrating methods to optimize data transmission parameters in accordance with the present invention;

FIG. 6 is a schematic block diagram of another embodiment of a proprietary network in accordance with the present invention;

FIG. 7A is a schematic block diagram of additional embodiments of a communication system in accordance with the present invention; and FIG. 7B is a logic diagram of an embodiment of a method for maintaining persistent TCP proxy connections with multicast distribution of TCP session messaging in accordance with the present invention.

DETAILED DESCRIPTION OF THE INVENTION

Figure 1:
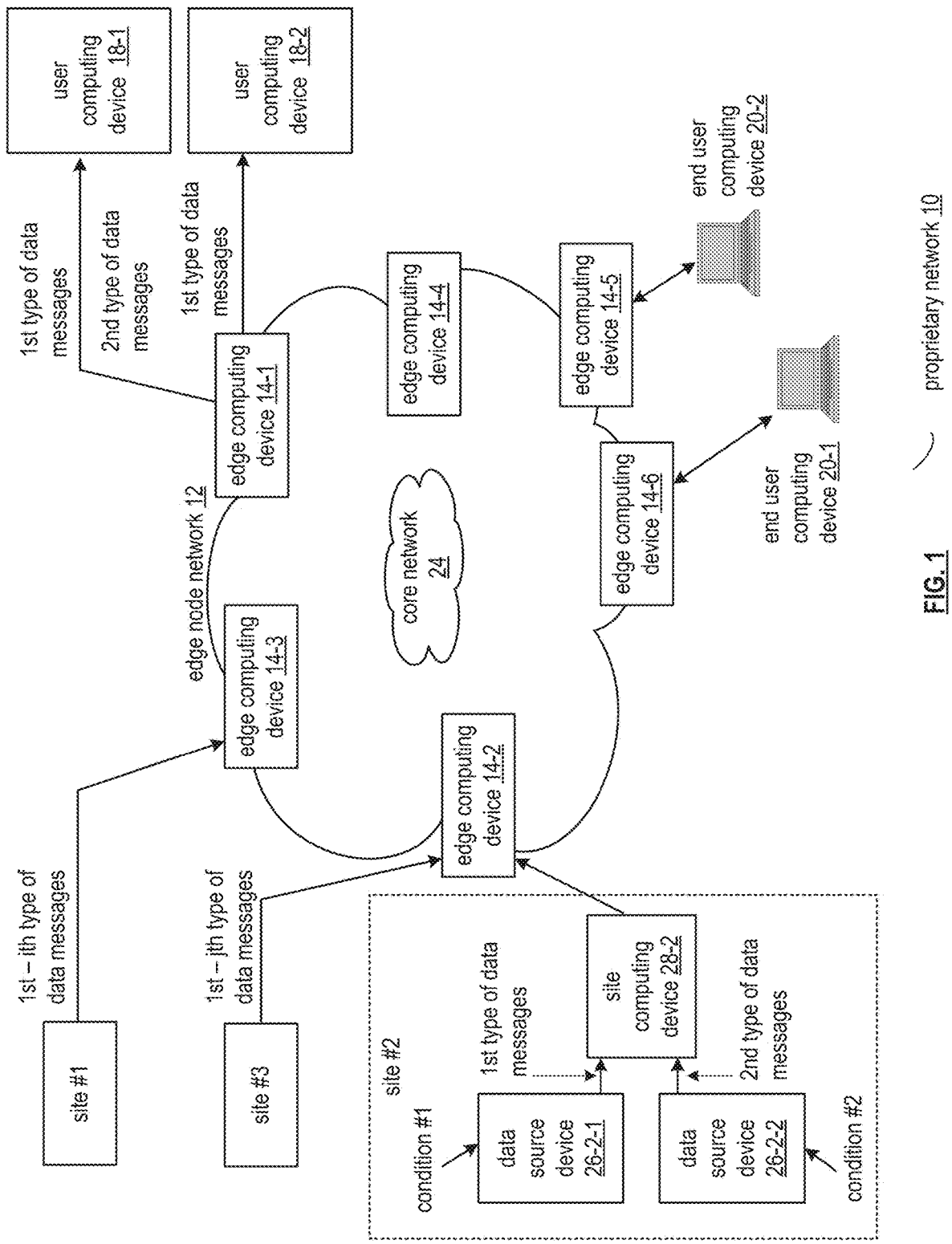
FIG. 1 is a schematic block diagram of an embodiment of a proprietary network in accordance with the present invention.

FIG. 1 is a schematic block diagram of an embodiment of a proprietary network 10 that includes an edge node network 12, a plurality of sites #1 through #3, a core network 24, a plurality of user computing devices 18-1 through 18-2, and a plurality of end user computing devices 20-1 through 20-2. The core network 24 includes at least one of the Internet, a public radio access network (RAN), and any private network. The edge node network 12 includes a plurality of edge computing devices 14-1 through 14-6 which utilize the core network 24 to communicate with each other.

Alternatively, the edge computing devices may communicate directly with each other by utilizing various access technologies including one or more of T-carrier/E-carrier (T1/E1), Digital Subscriber Line (DSL), Metro Ethernet, Hybrid Fiber Coax (HFC), and optical fiber. For instance, a transport protocol such as Multiprotocol Label Switching (MPLS), Asynchronous Transport Mode (ATM), or frame relay provides communications between distant edge computing devices over the access technology.

The sites include one or more data source devices and a site computing device for monitoring various conditions within a geographic area associated with each site. Each site may be associated with at least a portion of a facility (e.g., a home, an apartment, a store, a school, a hospital, a hotel, an office, a factory, a refinery, a farm plot, an airport, a water treatment plant, electrical generation and/or transmission complex, an oil exploration facility, etc.). For example, site #2 includes site computing device 28-2 and data source devices 26-2-1 and 26-2-2.

Each data source device is capable of detecting at least one condition, generating data based on the condition (e.g., on both a continual basis or when requested), and sending the data as data messages to an associated site computing device. The site computing device temporary stores and shares, via the edge node network 12, the data messages with various user computing devices and end user computing devices. The site computing device determines which of the various user computing devices and end user computing devices to share the data with based on authorized requests for the data and a common responsibility list.

The data includes one or more of sensor data associated with the condition of a local environment (e.g., a site) and use data (e.g., statistical usage data, user identifiers, error messages, alerts, warnings, level information, etc.) associated with a mechanism (e.g., a machine, a local computer, etc.). The sensor data further includes raw sensor data (e.g., directly from the sensor) and an interpretation of the raw sensor data (e.g., a summary, a result of applying an algorithm to the raw sensor data). The data still further includes data retrieved from a memory device associated with the data source device and any other data produced by the data source device.

The data source device generates the data messages by type. The type includes an association with a particular type of data such as error code data, weather data, smart grid control data, etc. The various types of data are associated with various priority levels. The priority level includes an absolute priority level and a relative priority level (e.g., two other data types). The priority level is utilized to establish a performance level of sending the data messages from the data source device to the user computing device (e.g., user computing devices and end user computing devices).

The performance includes a variety of performance factors associated with delivery of the data messages. The performance factors include transmission speed (e.g., transmission latency) and transmission bandwidth (e.g., message capacity) through the proprietary network 10. In a first embodiment of prioritizing performance, a priority level for a particular data type has an associated desired performance level. For example, when the data is of a first type of data message (e.g., real-time smart grid information), the transmission latency has a desired transmission time (e.g., a goal for an elapsed time from receipt of the data message to delivery of the data message to the user computing device) of 20 ms. As another example, when the data is of a second type of data message (e.g., home appliance usage information), the transmission latency has a second desired transmission time of 200 ms.

In a second embodiment of prioritizing performance, the desire performance level is a function of a requirement of the recipient computing device. For example, the user computing device 18-1 has a desired transmission time for the first type of data messages (e.g., the real-time smart grid information) of 20 ms and the user computing device 18-2 has a desired transmission time for the same first type of data messages of 50 ms.

The edge computing devices of the edge node network 12 route the requests for the data from the user computing devices and the end user computing devices to the site computing devices. The edge computing devices further routes the data from the site computing devices to the user computing devices and end user computing devices associated with the requests for the data and the common responsibility list.

The routing by the edge computing devices is based on various authentication and authorization techniques to ensure that only authorized user computing devices (e.g., end user computing devices and/or user computing devices) are allowed to access data from the data source devices. Thus, the edge node network 12 provides additional data transport security beyond the core network 24.

The user computing devices 18-1 and 18-2 request the data and process the data to produce process data. The processing of the data includes executing various data applications utilizing the data, storing the data, utilizing the data as inputs to an operational control system to provide a service, and using the data in a hosted data application. The requesting of the data is in accordance with needs of the various applications and services.

The end user computing devices 20-1 and 20-2 request the data and further request results of processing of the data by the user computing devices. For example, the end user computing devices control the various data applications hosted by the user computing devices and receive results of execution of the data applications (e.g., receive processed data).

The site computing devices, edge computing devices, user computing devices and end user computing devices may be implemented with a computing entity. A computing entity includes a cluster of one or more computing devices. For example, a first computing entity may be implemented to include the site computing device 28-2 and the edge computing device 14-2.

Figure 2:
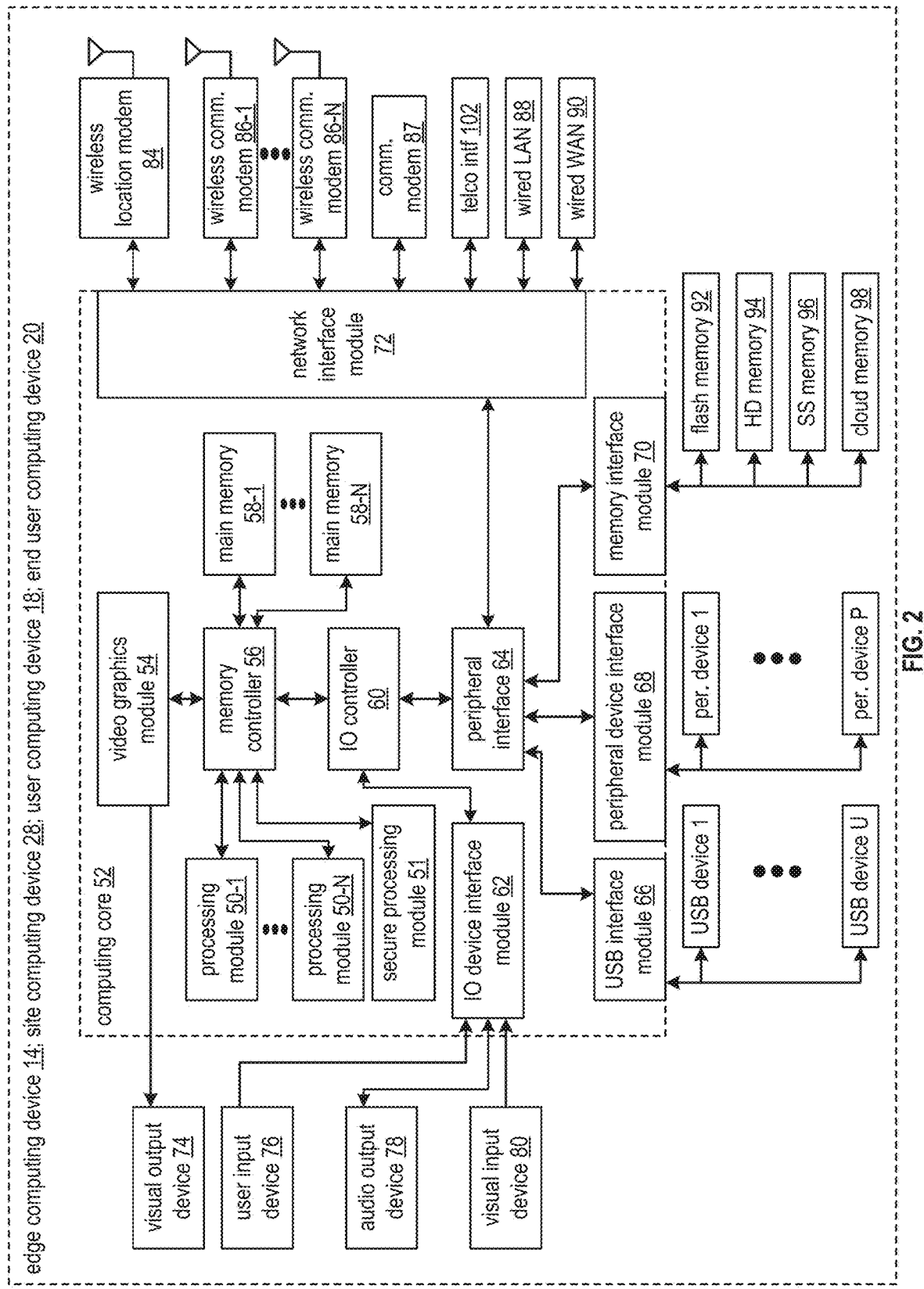
FIG. 2 is a schematic block diagram of various computing devices of a proprietary network in accordance with the present invention.

Each computing device includes one or more computing cores and each computing core includes one or more processing modules along with memory and input/output support devices and/or modules as illustrated in FIG. 2. In general, a computing core is any electronic device that can communicate data, process data, and/or store data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices include a personal computer (PC), a computer server, a cable set-top box, a satellite receiver, a television set, a printer, a home appliance, home entertainment equipment, a security camera controller, a video game console, a critical infrastructure controller, and/or any type of home, office or cloud computing equipment that includes a computing core.

The proprietary network 10 generally supports secure routing of the data from the sites to the user computing devices based on security procedures, synchronization parameters, and configuration information. For example, a first computing entity receives the data from a data source device and forwards the data to an intermediate computing entity of the edge node network 12 in accordance with a local copy the common responsibility list. The intermediate computing entity further forwards the data to a second computing entity in accordance with another local copy the common responsibility list. The second computing entity forwards the data to a user computing device in accordance with yet another local copy the common responsibility list.

Each computing entity has a particular responsibility to a user computing device with regards to the forwarding of the data. For example, the second computing entity is responsible for processing data (e.g., subscription) requests from the user computing device to update its local copy of the common responsibility list and to update other computing entities of the requests. All of the computing entities are further responsible for forwarding subscribed data to the user computing device in accordance with a local copy of the common responsibility list.

The security procedures includes identifying computing devices, challenging identity through authentication, producing encryption keys, securely exchanging authentication information, encrypting computing device identifiers, and encrypting data for transmission, while preserving device anonymity when desired. The encrypting of the data includes utilization of encryption keys with an encryption algorithm.

The synchronization parameters include one or more of control information, configuration information, and analytics information. The control information includes operational mode information and routing information (e.g., routes). The operational mode information includes how a computing device is to operate, i.e. as an edge computing device and/or as a site computing device. The operational mode information further includes which functions are to be supported by the computing device (e.g., routing, security, ingress support, egress support, pass-through support).

The configuration information includes deployment information, software information, security information, routing information, addressing information, protocol information, and presence information. The deployment information includes lists of logical connection paths between edge computing devices, data source devices associated with a particular edge computing device or site computing device, data source devices associated with particular user computing devices, data source devices associated with particular applications and/or storage facilities of a particular user computing device, etc.

The software information includes software version lists and software for site computing devices and edge computing devices. The security information includes public-private encryption keys, key generation values, key seeds, key identifiers, encryption algorithm identifiers, updated encryption algorithms, hardware-embedded secret keys, etc.

The routing information includes status of routes between edge computing devices, physical links between edge computing devices, etc. The addressing information includes identifiers of data source devices, identifiers of site computing devices and edge computing devices, and identifiers of sites, etc.

The protocol information includes desired protocol(s) for an application supported by the user computing devices 18-1 and 18-2, data protocol identifiers associated with messages that traverse the edge node network 12 carrying data and more, and data protocols supported by the data source devices, etc. The presence information includes real-time status of computing devices of the proprietary network 10 and historical status information of the computing devices.

The analytics information includes summaries of use of the proprietary network 10 and portions of the data. The summaries include a list of data types of the data being communicated on the proprietary network 10, historical patterns of the data type communication, and historical usage patterns of the proprietary network 10 to communicate data on behalf of each data source device, etc. The portions of the data include random samples of data, targeted samples of the data, and data associated with a particular historical pattern.

FIG. 2 is a schematic block diagram of various computing devices of the proprietary network 10 of FIG. 1. In an embodiment, the edge computing devices 14, the site computing devices 28, the user computing devices 18, and the end user computing devices 20 include a computing core 52, one or more visual output devices 74 (e.g., video graphics display, touchscreen, LED, etc.), one or more user input devices 76 (e.g., keypad, keyboard, touchscreen, voice to text, a push button, a microphone, etc.), one or more audio output devices 78 (e.g., speaker(s), headphone jack, a motor, etc.), and one or more visual input devices 80 (e.g., camera, photocell, etc.).

The computing devices further include one or more universal serial bus (USB) devices (USB devices 1-U), one or more peripheral devices (e.g., peripheral devices 1-P), and one or more memory devices (e.g., one or more flash memory devices 92, one or more hard drive (HD) memories 94, one or more solid state (SS) memory devices 96, and/or cloud memory 98). The computing devices further include one or more wireless location modems 84 (e.g., global positioning satellite (GPS), Wi-Fi, angle of arrival, time difference of arrival, signal strength, dedicated wireless location, etc.), and one or more wireless communication modems 86-1 through 86-N (e.g., a cellular network transceiver, a wireless data network transceiver, a Wi-Fi transceiver, a Bluetooth transceiver, a 315 MHz transceiver, a zig bee transceiver, a 60 GHz transceiver, etc.).

The computing devices further include a telco interface 102 (e.g., to interface to a public switched telephone network), a wired local area network (LAN) 88 (e.g., optical, electrical), a wired wide area network (WAN) 90 (e.g., optical, electrical), and a communication modem 87 (e.g., facilitating wireless and/or wireline communications of data)

The computing core 52 includes a video graphics module 54, one or more processing modules 50-1 through 50-N, a secure processing module 51 (e.g., storing keys and executing encryption algorithms), a memory controller 56, one or more main memories 58-1 through 58-N (e.g., RAM as local memory), and one or more input/output (I/O) device interface modules 62. The computing core 52 further includes an input/output (I/O) controller 60, a peripheral interface 64, one or more USB interface modules 66, one or more network interface modules 72, one or more memory interface modules 70, and/or one or more peripheral device interface modules 68.

Each of the interface modules 62, 66, 68, 70, and 72 includes a combination of hardware (e.g., connectors, wiring, etc.) and operational instructions stored on memory (e.g., driver software) that are executed by one or more of the processing modules 50-1 through 50-N and/or a processing circuit within the interface module. Each of the interface modules couples to one or more components of the computing devices. For example, one of the IO device interface modules 62 couples to an audio output device 78. As another example, one of the memory interface modules 70 couples to flash memory 92 and another one of the memory interface modules 70 couples to cloud memory 98 (e.g., an on-line storage system and/or on-line backup system).

In other embodiments, the computing devices may include more or less devices and modules than shown in this example embodiment. The secure processing module 51 (e.g., a Trusted Platform Module (TPM)) includes a hardware module for securely generating and storing security parameters (e.g., encryption keys) when required for secure attestation and authenticated access to the edge node network 12 and cannot be tampered with by application software.

Figure 3:
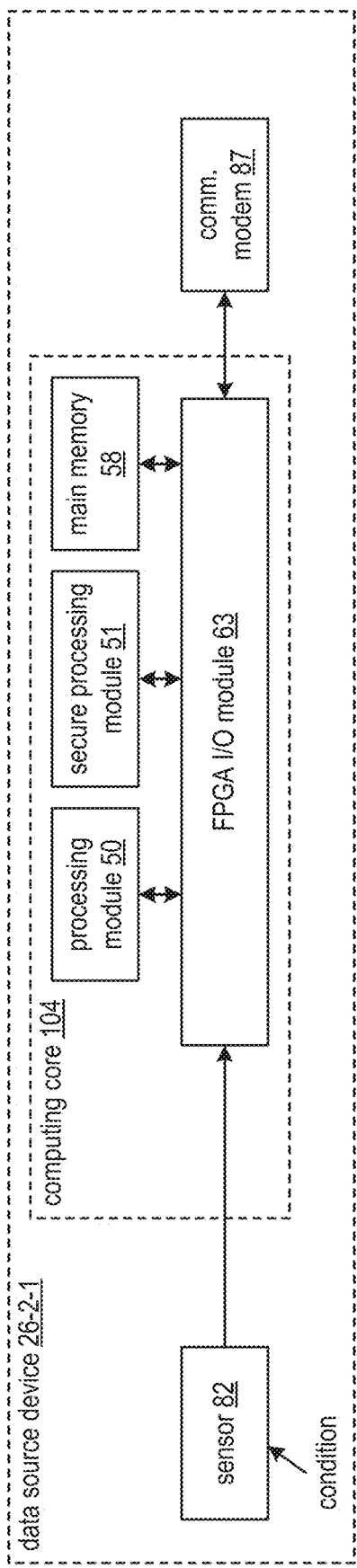
FIGS. 3 and 4 are schematic block diagrams of embodiments of a data source device of a proprietary network in accordance with the present invention.
Figure 4:
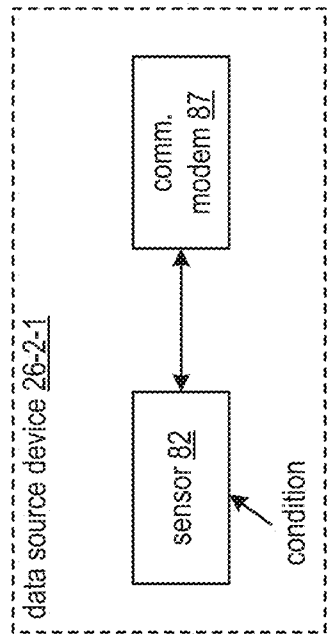

FIGS. 3 and 4 are schematic block diagrams of embodiments of a data source device of a proprietary network. FIG. 3 is a schematic block diagram of an embodiment of the data source device 26-2-1 of FIG. 1. The data source device 26 includes a sensor 82, a computing core 104, and the communication modem 87 of FIG. 2. The computing core 104 includes at least one processing module 50 of the processing modules 50-1 through 50-N of FIG. 2, the secure processing module 51 of FIG. 2, at least one main memory 58 of the main memories 58-1 through 58-N of FIG. 2, and one or more Field Programmable Gate Array (FPGA) input/output (I/O) modules 63. In other embodiments, the device may include more or less devices and modules than shown in this example embodiment. For example, two or more sensors 82. In other embodiments, the data source device 26 includes more or less devices and modules than shown in this example embodiment. For instance, the computing core 104 only includes the FPGA I/O module 63.

The sensor 82 interprets the condition to provide sensor data to the computing core 104. The computing core 104 generates data based on the sensor data of the condition and sends, via the communication modem 87, the data to an associated site computing device or other device. For instance, the processing module 50 controls the FPGA I/O module 63 to route the sensor data to the main memory 58 for temporary storage. The processing module 50 subsequently routes, via the FPGA I/O module 63, the temporarily stored sensor data from the main memory 58 to the secure processing module 51 for encryption to produce encrypted data. The encryption is performed utilizing a selected encryption algorithm and encryption key stored within the secure processing module 51.

Having facilitated encryption of the data, the processing module 50 further facilitates routing, via the FPGA I/O module 63, of the encrypted data from the secure processing module 51 to the communication modem 87 for transmission to the associated site computing device. Alternatively, the processing module 50 further facilitates routing, via the FPGA I/O module 63, the encrypted data from the processing module 51 to the main memory 58 for temporary storage until the communication modem 87 is ready to transmit the encrypted data.

FIG. 4 illustrates another embodiment of the data source device 26-2-1 of FIG. 3. The data source device 26-2-1 includes the sensor 82 of FIG. 3 and the communication modem 87 of FIG. 2. In an example of operation, the sensor 82 interprets the condition to produce the sensor data and sends the sensor data to the communication modem 87 for transmission to the associated site controller device, or other device, as one or more data messages.

FIGS. 5A, 5B, 5C, and 5D are schematic block diagrams of embodiments of a proprietary network illustrating methods to optimize data transmission parameters through a series of steps. The proprietary network 10 includes a plurality of N local networks 500-1 through 500-N, a plurality of computing entities 200-1 through 200-3, user computing devices 18-2 through 18-3 (e.g., similar to user computing devices 18-1 through 18-2 of FIG. 1), the edge node network 12 of FIG. 1, and the core network 24 FIG. 1. In an embodiment, each local network includes a set of n data source devices. For example, local network 500-1 includes data source devices 26-1-1 through 26-1-*n*.

In an embodiment, the computing entity 200-1 includes a site computing device 28-1 (e.g., similar to the site computing device 28-2 of FIG. 1) and edge computing device 14-1 (e.g., similar to edge computing device 14-2 of FIG. 1). In another embodiment, the computing entity 200-1 includes a plurality of N site computing devices (e.g., one for each local network).

In an embodiment, computing entities 200-2, and 200-3 include, respectively, edge computing device 14-2 and edge computing device 14-3 of FIG. 1. In yet another embodiment, the computing entity 200-1 further includes one or more of the local networks 500-1 through 500-N.

FIG. 5A illustrates an example of the optimizing of the data transmission parameters where the computing entity 200-1 receives a plurality of sets of data streams from the plurality of local networks 500-1 through 500-N. A data steam includes any type of data (e.g., file data, sensor data, etc.) and with static or dynamic timing properties (e.g., real time stream, continuous data, one time data, static file, burst data, etc.).

Each local network of the plurality of local networks 500-1 through 500-N is affiliated with a set of n data source devices. A data source device of the set of data source devices aggregates and packetizes a set of m raw data elements into a corresponding one of the plurality of sets of data streams in accordance with a corresponding aggregating and packetizing protocol. For example, data source device 26-1-1 (e.g., of local network 1, stream 1) of the set of data source devices of local network 500-1 aggregates and packetizes a set of m raw data elements 44-1-1-1 through 44-1-1-*m* into a corresponding one of the plurality of sets of data streams in accordance with a corresponding aggregating and packetizing protocol of the data source device 26-1-1.

In an embodiment, each data source device utilizes a unique aggregating and packetizing protocol. In other embodiments, at least some of the data source devices utilize common aggregating and packetizing protocols. A particular aggregating and packetizing protocol establishes the data transmission parameters between a local network and a computing entity to affect timing and efficiency data transfer.

The aggregating and packetizing protocols includes guidance on how much of a particular raw data element to aggregate with other data elements within a common time frame, how much of the aggregated data elements to include in a data packet of one of the data streams, and how often to transmit a data packet of a data stream. The aggregating and packetizing protocols further includes wireless and/or wireline transmission parameters depending on connectivity between the local network and the competing entity. For example, the wireless transmission parameters includes a radio frequency, a wireless modulation approach, a wireless signaling approach, and a wireless access approach. As another example, the wireline transmission parameters includes a wireline carrier frame size, a wireline modulation approach, a wireline signaling approach, and a wireline access approach.

Having received the plurality of sets of data streams, the computing entity 200-1 de-aggregates and de-packetizes the plurality of sets of data streams in accordance with corresponding aggregating and packetizing protocols of the plurality of sets of data source devices to recover a plurality (e.g., N) of sets (e.g., n) of sets (e.g., m) of raw data elements. For example, the site computing device 28-1 de-aggregates and de-packetizes a first set of data streams of the plurality of sets of data streams in accordance with the corresponding aggregating and packetizing protocols of the plurality of sets of data source devices 26-1-1 through 26-1-*n* to recover raw data 44-1-1-1 through raw data 44-1-1-*m* from data source device 26-1-1 up through raw data 44-1-*n*-1 through raw data 44-1-*n*-*m* from data source device 26-1-*n* all of local network 500-1.

Figure 5B:
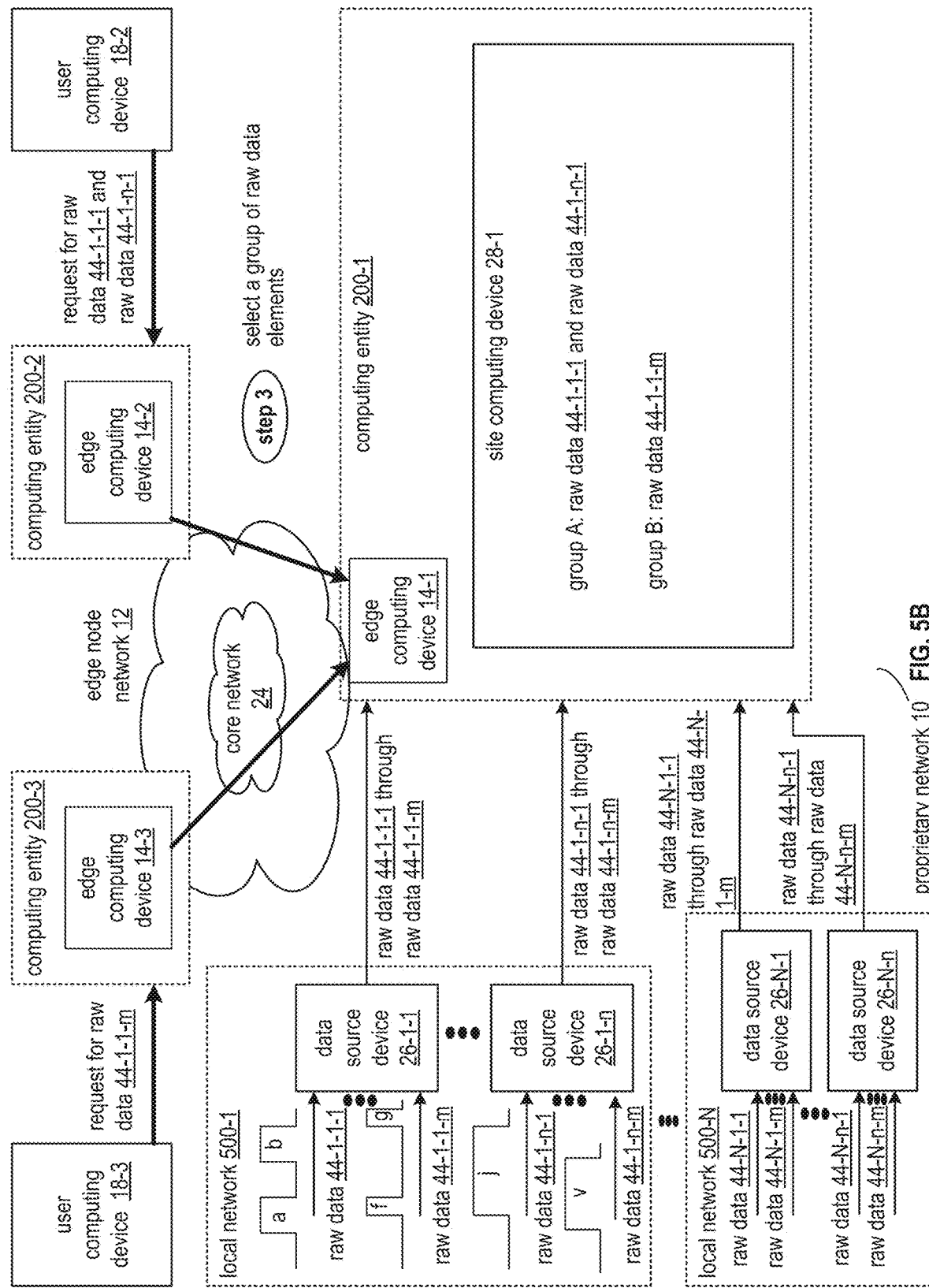

FIG. 5B further illustrates the example of the optimizing of the data transmission parameters where, for a user computing device, the computing entity 200-1 selects a group of raw data elements from the plurality of sets of sets of raw data elements in accordance with client data selection criteria. The selecting includes multiple approaches. In a first approach, the site computing device 28-1 interprets a request from the user computing device to identify the group of raw data elements. For example, the user computing device 18-3 issues, via the computing entity 200-3 and the edge node network 12, a request for raw data 44-1-1-*m* to the computing entity 200-1 where the site computing device 28-1 interprets the request for the raw data 44-1-1-*m* from the user computing device 18-3.

As another example of the first approach, the user computing device 18-2 issues, via the computing entity 200-2 and the edge node network 12, a request for raw data 44-1-1-1 and raw data 44-1-n-1 to the computing entity 200-1. The site computing device 28-1 interprets the request for the raw data 44-1-1-1 and raw data 44-1-n-1 from the user computing device 18-2.

A second approach of the selecting includes the site computing device 28-1 selecting a raw data element of the group of raw data elements based on a data type of the raw data element and an affiliation between the user computing device and the data type. For example, the user computing device 18-3 issues a subscription request to the computing entity 200-1 indicating that the user computing device 18-3 desires to be affiliated with a second type of data that is associated with the raw data element 44-1-1-m. Other approaches of the selecting further includes utilizing a predetermined mapping, selecting based on quality of the received raw data elements (e.g., select when the raw data is known to be valid), selecting based on raw data element availability (e.g., select what is available now), and selecting based on a favorable comparison of required network bandwidth and available network bandwidth.

FIG. 5C further illustrates the example of the optimizing of the data transmission parameters where the computing entity 200-1 aggregates and packetizes the group of raw data elements in accordance with a network aggregating and packetizing protocol to produce a client data packet. The network aggregating and packetizing protocol establishes the data transmission parameters between the computing entity and the user computing device receiving the client data packet to affect timing and efficiency data transfer.

The network aggregating and packetizing protocols includes guidance on how much of a particular raw data element to aggregate with other data elements within a common time frame, how much of the aggregated data elements to include in the client data packet, and how often to transmit a new client data packet to the same user computing device. The network aggregating and packetizing protocols further includes wireless and/or wireline transmission parameters depending on connectivity between edge computing devices via the edge node network 12 and/or the core network 24.

The aggregating and packetizing of the group of raw data elements in accordance with the network aggregating and packetizing protocol to produce the client data packet includes the site computing device 28-1 selecting a corresponding portion of each raw data element of the group of raw data elements in accordance with the network aggregating and packetizing protocol. For example, the site computing device 28-1 selects portions of raw data element 44-1-1-1 and raw data element 44-1-n-1 corresponding to a common time frame.

The aggregating and packetizing of the group of raw data elements further includes the site computing device 28-1 generating the client data packet to include the selected corresponding portions of each of the raw data elements of the group of raw data elements. For example, the site computing device 28-1 generates client data packet A to include the raw data element 44-1-1-1 and the raw data element 44-1-n-1 for the user computing device 18-2. As another example, the site computing device 28-1 generates client data packet B to include the raw data element 44-1-1-m for the user computing device 18-3.

Having produced the client data packet, the computing entity 200-1 transmits the client data packet to the user computing device. The transmitting of the client data packet to the user computing device includes identifying another computing entity associated with the user computing device and sending, via the other computing entity, the client data packet to the user computing device. For example, the edge computing device 14-1 transmits, via the edge node network 12, the core network 24, and the computing entity 200-2 (e.g., associated with the user computing device 18-2), the client data packet A to the user computing device 18-2. As another example, the edge computing device 14-1 transmits, via the edge node network 12, the core network 24, and the computing entity 200-3 (e.g., associated with the user computing device 18-3), the client data packet B to the user computing device 18-3.

Figure 5D:
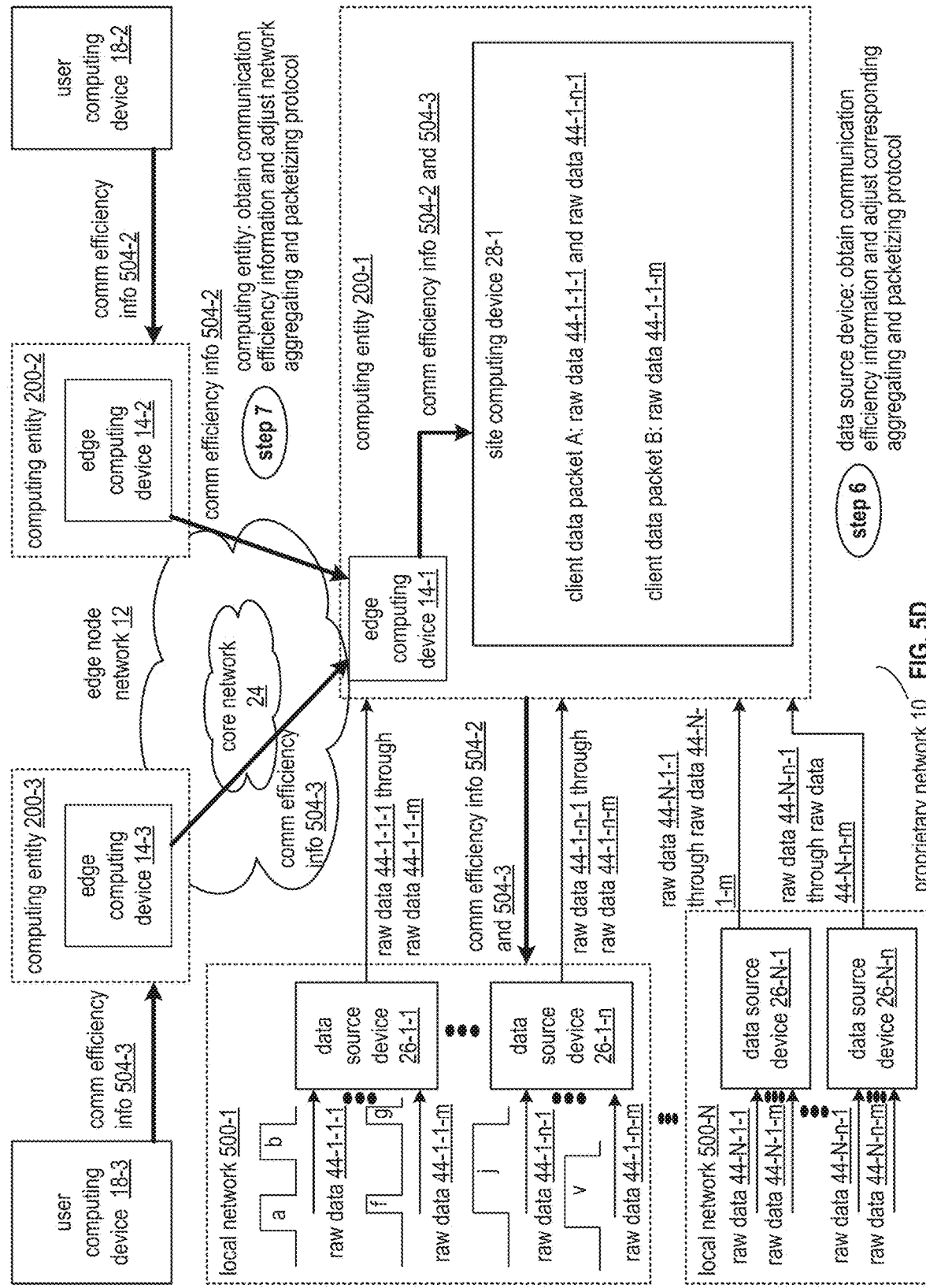

FIG. 5D further illustrates the example of the optimizing of the data transmission parameters where the data source device and/or the computing entity adjust associated aggregating and packetizing protocols for transmission of further raw data elements to the user computing devices. In a first example, for the data source device, the data source device obtains communication efficiency information. The communication efficiency information is associated with utilization of the client data packet by the user computing device. Examples of the communication efficiency information includes one or more of data communication delay (e.g., latency between generation of a particular raw data element and receipt of the raw data element by any computing entity and/or a user computing device), data loss (e.g., within a wireless or wireline network), and data communication volume per unit of time (e.g., data bandwidth).

The obtaining of the communication efficiency information includes facilitating a performance test and interpreting performance test results (e.g., between the data source device and the associated computing entity). The obtaining further includes requesting the communication efficiency information and receiving the communication efficiency information (e.g., any computing entity and/or from a user computing device). For example, data source device 26-1-1 receives communication efficiency information 504-2 from user computing device 18-2 and receives communication efficiency information 504-3 from computing entity 200-3.

Having obtained the communication efficiency information, the data source device adjusts the corresponding aggregating and packetizing protocol in accordance with the communication efficiency information. The adjusting includes a variety of approaches.

A first approach includes aggregating less of subsequently received raw data elements into a further corresponding one of the plurality of sets of data streams when the communication efficiency information indicates an unfavorable data communication delay (e.g., acquire less data more often). A second approach includes packetizing subsequently aggregated raw data elements more often into the further corresponding one of the plurality of sets of data streams when the communication efficiency information indicates the unfavorable data communication delay.

In a second example, for the computing entity, the computing entity obtains the communication efficiency information. The obtaining of the communication efficiency information by the computing entity includes facilitating a network performance test and interpreting network performance test results (e.g., between the computing entity and other computing entities and/or the user computing device). The obtaining by the computing entity further includes requesting the communication efficiency information and receiving the communication efficiency information (e.g., any computing entity and/or from a user computing device). For example, the computing entity 200-1 receives the communication efficiency information 504-2 from the user computing device 18-2 and receives the communication efficiency information 504-3 from the computing entity 200-3.

Having obtained the communication efficiency information, the computing entity adjusts the network aggregating and packetizing protocol in accordance with the communication efficiency information. The adjusting includes a variety of approaches for the computing entity.

A first approach includes the computing entity aggregating less of subsequently selected raw data elements into a subsequent group of raw data elements when the communication efficiency information indicates an unfavorable data communication delay (e.g., acquire less data more often). A second approach includes the computing entity packetizing subsequently aggregated groups of raw data elements more often into subsequent client data packets when the communication efficiency information indicates the unfavorable data communication delay.

The examples described above in conjunction with one or more processing modules of one or more computing devices can alternatively be performed by other modules of the proprietary network 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, a seventh memory element, etc.) that stores operational instructions can, when executed by the one or more processing modules of the one or more computing devices of the proprietary network 10, cause the one or more computing devices to perform any or all of the examples described above.

FIG. 6 is a schematic block diagram of another embodiment of a secure data network that includes a data source device 26, a site computing device 28, a plurality of edge computing devices 14-1 through 14-7, master edge computing devices 15-1 and 15-2, at least two user computing devices 18-1 and 18-2, and at least two end user computing devices 20-1 and 20-2. The data source includes data source device 26 may include one or more of the devices and the modules of the data source device 26-2-1 of FIG. 3. For example, the data source device 26 includes the sensor 82 and the processing module 50 of FIG. 3.

The processing module 50 of the data source device 26 includes an edge node network utilization module 110. The site computing device 28 includes the processing module 50 of FIG. 2. The processing module 50 includes an access module 112, a routing module 116, a security module 122, and an analytics module 114.

Each edge computing device of the plurality of edge computing devices 14-1 through 14-7 includes one or more of the devices and the modules of the computing devices of FIG. 2. For example, each edge computing device includes the processing module 50 of FIG. 2. The processing module 50 includes the access module 112, the analytics module 114, the routing module 116, an identity module 118, a presence module 120, the security module 122, and a data transformation module 124.

The edge node network utilization module 110 includes one or more of the functions associated with the edge computing devices 14-1 through 14-7. For instance, the edge node network utilization module 110 includes the access module 112, the identity module 118, and the security module 122. Each of the master edge computing devices 15-1 and 15-2 further operate to distribute any operational information required for the secure data network. For instance, information to establish routes and establish security credentials that is not readily available by the edge computing devices (e.g., a master routing table maintained by the master edge computing devices).

Generally, the modules 112-124 within the processing modules 50 of the data source device 26, the site computing device 28, and the edge computing devices 14-1 through 14-7 process (e.g., generate, store, utilize for decision-making, transfer) synchronization parameters within synchronization messages 38 to maintain operation of the secure data network. For example, functionality of the access module 112 includes causing the processing module 50 to utilize one or more of protocol information and configuration information to provide physical access to other nodes and/or devices.

Functionality of the analytics module 114 includes causing the processing module 50 to utilize the analytics information to optimize generation and transmission of data messages and transformed data messages. Functionality of the routing module 116 includes causing the processing module 50 to utilize the routing information to optimize transmission of information through the edge computing devices.

Further examples of the processing include functionality of the identity module 118, which includes causing the processing module 50 to utilize the addressing information to identify which sensors are associated with which data source devices and which data source devices are to access which user computing devices. Functionality of the presence module 120 includes causing the processing module 50 to utilize the presence information to optimize utilization of various edge nodes to optimize data traffic routes between the data source device and a corresponding user computing device. Functionality of the security module 122 includes causing the processing module 50 to utilize security information to authenticate a desirable and valid connection between edge computing devices and data source devices and to protect confidential information exchange between the edge computing devices and data source devices.

Functionality of the data transformation module 124 includes causing the processing module 50 to utilize the protocol information to convert portions of the data messages into the transformed data messages to support multiple desirable attributes of the secure data network. The desired attributes include a favorable security level, a favorable efficiency level, a favorable data latency level, and a favorable compatibility level with numerous data protocols associated with data applications of the user computing devices.

In an example of operation of the secure data network, the edge computing devices 14-1 through 14-7, the site computing device 28, and the data source device 26 exchange synchronization messages 38 from time to time to develop and convey the synchronization parameters. For example, at least some the edge computing devices 14-1 through 14-7 convey, by exchanging with each other, at least some of the synchronization parameters to include one or more of the configuration information, the analytics information, the protocol information, the addressing information, the security information, the routing information, and the presence information. For instance, edge computing device 14-1 receives one or more of the synchronization patterns from the user computing device 18-1 for local storage within a memory of the edge computing device 14-1.

A trusted edge computing device control application of the user computing device 18-1 is affiliated with the plurality of edge computing devices 14-1 through 14-7. In another instance, edge computing device 14-1 generates a synchronization message 38 to include substantially all of the synchronization parameters and transmits the synchronization message 38 to the edge computing device 14-6 to update the synchronization parameters stored locally within a memory of the edge computing device 14-6.

As another example of the developing and conveying of the synchronization parameters, at least some of the edge computing devices 14-1 through 14-7, the site computing device 28, and the data source device 26 develop, by generating with each other (e.g., determining, modifying, updating, correcting, etc.), at least some of the synchronization parameters to include one or more of the configuration information, the analytics information, the protocol information, the addressing information, the security information, the routing information, and the presence information. For instance, the site computing device 28 exchanges limited security information (e.g., to lead to generation of a common secret encryption key) with the data source device 26 to further develop trusted security between the site computing device 28 and the data source device 26.

In another instance, the site computing device 28 receives configuration information from the data source device 26. The configuration information includes addressing information associated with the sensor 82. The site computing device 28 further receives companion configuration information from a data application associated with the user computing device 18-1 to match the sensor with the data application to generate further updated configuration information. In yet another instance, the edge computing device 14-7 monitors data messages received from the site computing device 28 to generate updated analytics information based on data attributes of data within the data messages (e.g., data types, data sizes, etc.).

Having developed and conveyed a sufficient number and sufficient level of the synchronization parameters to support ongoing operations, the secure data network facilitates communication of data from the sensor 82 to one or more corresponding data applications of the user computing devices 18-1 and 18-2. In an example of operation of the communication of the data, having established trust and security information between the data source device 26 and the site computing device 28, the site computing device 28 receives data messages 34-1 from the data source device 26. The edge node network utilization module 110 encodes data from the sensor 82 in accordance with a sensor data protocol to produce the data messages 34-1. The encoding of the data includes utilizing at least one of an industry standard sensor data protocol and a proprietary data protocol. The industry standard sensor data protocols include one or more of Message queue telemetry transport (MQQT), constrained application protocol (CoAP), and data distribution service (DDS).

Having received the data messages 34-1, the site computing device 28 identifies active data applications associated with the user computing devices 18-1 and 18-2 that are affiliated with the data source device 26 and/or the sensor 82 based on one or more of the addressing information and the configuration information. Having identified the active data applications, the site computing device 28 determines at least a portion of a route for transferring data associated with the data messages 34-1 to the user computing devices 18-1 and 18-2 based on one or more of the routing information and the presence information. Having determined the routing information, the site computing device 28 sends the data messages 34-1 to the edge computing device 14-7 in accordance with the routing information.

Having received the data messages 34-1, the edge computing device 14-7 determines whether to convert the data messages into transformed data messages based on one or more of the configuration information, the analytics information, the addressing information, and the protocol information. For instance, the edge computing device 14-7 determines to convert the data messages 34-1 from the sensor data protocol into first and second data message protocols when the protocol information indicates that the first and second data protocol messages are associated with the affiliated data applications of the user computing devices 18-1 and 18-2.

In another instance, the edge computing device 14-7 determines to convert the data messages 34-1 from the sensor data protocol into a third data message protocol. The determining includes selecting the third data message protocol when the analytics information indicates that data optimization (e.g., providing important data on a more timely basis, estimating missing data based on historical data, summarizing multiple data points, etc.) based on the an interpretation of a data attribute (e.g., actual data, frequency of data transmission, a data type, etc.) of the data messages 34-1 is associated with the third data message protocol and the configuration information indicates that user computing devices 18-1 and 18-2 are compatible with the third data message protocol.

Having determined to convert the data messages 34-1, the edge computing device 14-7 generates transformed data messages 36-1 and transformed data messages 36-2 from the data messages 34-1 based on attributes of the first and second data message protocols of the protocol information. Having generated the transformed data messages, the edge node 14-7 obtains the route for transferring the transformed data messages to the corresponding cloud services. The obtaining may include retrieving route information and updating the retrieve route information based on one or more of updated presence information, updated security information, and updated routing information.

In an instance of obtaining the route, the edge computing device 14-7 determines an updated route to include sending the transformed data messages to the edge computing device 14-3 when the updated presence information and updated routing information are favorable with regards to utilizing the edge computing device 14-3 and sending the transformed data messages 36-1 and 36-2 to the edge computing device 14-3. Alternatively, the edge computing device 14-7 transmits the transformed data messages 36-1 and 36-2 directly to the user computing devices 18-1 and 18-2 via the core network 24 of FIG. 1 when attributes of the routing information are favorable for that route.

Having received the transformed data messages 36-1, the edge computing device 14-1 facilitates forwarding of the transformed data messages 36-1 to the user computing device 18-1 for utilization by the corresponding data application affiliated with the data source device 26 and/or the sensor 82. Having received the transformed data messages 36-2, the edge computing device 14-2 facilitates forwarding of the transformed data messages 36-2 to the user computing device 18-2 for utilization by the corresponding data application affiliated with the data source device 26 and/or the sensor 82.

Having processed the transformed data messages 36-1, the user computing device 18-1 exchanges corresponding application messages 40-1 with the end user computing device 20-1. Having processed the transformed data messages 36-2, the user computing device 18-2 exchanges corresponding application messages 40-2 with the end user computing device 20-2.

FIG. 7A is a schematic block diagram of another embodiment of the proprietary network 10 of FIG. 1. Generally, this invention presents solutions where the proprietary network supports persistent TCP proxy connections by utilizing a multicast or multipoint distribution of cached TCP state and TCP session messaging.

The proprietary network includes data source devices 26-1 through 26-N of FIG. 3, the user computing devices 18-1 through 18-N of FIG. 1, and the edge node network 12 of FIG. 1. Each data source device 26-1 through 26-N may include one or more of the devices and the modules of the data source devices 26-1 through 26-N of FIG. 6. For example, the data source devices 26-1 through 26-N include sensor 82 of FIG. 3 and the processing module 50 of FIG. 3, where the processing module 50 includes the edge node network utilization module 110 of FIG. 6.

The user computing devices 18-1 through 18-N support applications that utilize the sensor data or control aspects of data source devices 26-1 through 26-N. The user computing devices 18-1 through 18-N communicate through secure (e.g., SSL or TLS based) or clear TCP sessions with data source devices 26-1 through 26-N.

The edge node network 12 supports optimizing and enabling sensors on data source devices 26-1 through 26-N to interact and share data with the user computing 18-1 through 18-N. The edge node network 12 includes edge computing devices 14-1 through 14-N of FIG. 1, and may include one or more of the devices and the modules of FIG. 6. For example, the edge computing devices 14-1 through 14-N include the processing module 50 of FIG. 2, where the processing module 50 includes a resilient TCP proxy module 602-1, the access module 112 of FIG. 6, and the routing module 116 of FIG. 6.

The processing module 50 includes the security module 122 of FIG. 6 when encrypted TCP sessions (e.g., SSL, TLS) are utilized. The resilient TCP proxy module 602-1 functions as an enhanced TCP forwarding proxy capable of seamless failover of its current TCP sessions to another resilient TCP proxy module in one of the edge computing devices 14-2 through 14-N. In addition to a standard TCP proxy module 604, the resilient TCP proxy module 602-1 includes failover control module 608 and network TCP cache module 606 which support a portion of the necessary enhancements required for the seamless failover service.

Failover control module 608 performs several functions by providing a heartbeat message that signals other TCP forwarding proxy modules that its own TCP proxy module is in a fully functional state, maintaining a backup proxy priority list, and controlling the distribution of TCP messaging to the backup proxies for failover purposes. Failover control module 608 also monitors the working state of other resilient TCP forwarding proxy modules in the edge node network by tracking their heartbeat messages, and determines when resilient TCP proxy module 602-1 should assume failover responsibility for a failed TCP proxy in another edge computing device.

The network TCP cache module 606 maintains a copy of the TCP state and session messaging for at least some of the active TCP sessions being actively supported by resilient TCP proxy modules 602-2 through 602-N in the edge node network 12. The resilient TCP proxy module 602-1 is ready to provide failover service.

The access module 112 includes virtual IP addresses module 610 which functions to enable the single virtual IP address assigned to a specific resilient TCP proxy module to be utilized by another resilient TCP proxy module when actively providing failover service. With virtual IP address support, the active resilient TCP proxy for a given TCP session is considered the master destination for IP packets addressed to that virtual IP address. Upon a failure of the master, another member of the virtual IP address group can become master and the destination for that shared virtual IP address.

Routing module 116 includes IP multicast routing module 611 which functions to support IP multicast routing services through utilization of an IP multicast routing protocol. By minimizing the number of copies required to be routed through the edge node network 12, IP multicast routing can enable more efficient distribution of the active TCP session messaging for resilient TCP proxy modules sharing a local area network or sharing portions of common wide area routes. A common multicast IP address may be used for all TCP session distributions throughout the edge node network 12, or separate multicast IP addresses may be used for each resilient TCP proxy module on the backup proxy priority list for failover service.

In an example of operation, edge computing devices 14-1 through 14-N are deployed with resilient TCP proxy modules 602-1 through 602-N, which each publish the backup proxy priority list, virtual IP address for the specific TCP proxy module, and an IP multicast address to be used for distribution of TCP session messaging for failover purposes. The backup proxy priority list names the priority order for which another resilient TCP proxy module would assume the TCP proxy duties for a failed TCP proxy module. When a data source device 26-1 is deployed or reconfigured, edge computing device 14-1 becomes the current serving TCP forwarding proxy node for the data source device.

The resilient TCP proxy module 602-1 within processing module 50 of the edge computing device 14-1 issues a TCP proxy config 601-1 message to data source device 26-1. The TCP proxy config 601-1 message configures data source device 26-1 to utilize resilient TCP proxy module 602-1 for TCP sessions to the user computing device 18-1, and contains the virtual IP address assigned to resilient TCP proxy module 602-1. When resilient TCP proxy module 602-1 is functioning properly, any TCP session initiated between data source device 26-1 and user computing device 18-1 is addressed to the virtual IP address of the resilient TCP proxy module 602-1.

The TCP session messaging arrives at the proxy module, which then creates a split TCP session, with the pre-failure client TCP connection 620-1 supported between the data source device 26-1 and the resilient TCP proxy module 602-1, and the pre-failure server TCP connection 621-1 supported between resilient TCP proxy module 602-1 and user computing device 18-1. Since a TCP proxy operates as a man-in-the-middle element, and since the edge node network 12 is capable of providing secure authentication and transport services, then whenever secure TCP sessions are employed, the resilient TCP proxy module 602-1 must provide encryption and decryption services while appearing like the user computing device 18-1 in the secure initiation handshake with the data source device 26-1, and likewise appear like the data user device 26-1 for the secure initiation handshake for the split TCP session with the user computing device 18-1.

The splitting of the TCP connection by the TCP proxy enables improved TCP throughput when the links between TCP client (data source device 26-1), TCP proxy, and the user computing device 18-1 via low error-rate wired WAN links (e.g., Metro Ethernet, fiber/cable, etc.), since the TCP proxy can respond more quickly to TCP session transactions due to its improved proximity to both the data source device 26-1 and the user computing device 18-1 as an intermediary element.

Having received client or server-style TCP connection messaging, resilient TCP proxy module 602-1 distributes, using the assigned multicast IP address, the TCP session messaging as multicast TCP sessions 612-1 to the resilient TCP proxy modules 602-2 through 602-N on the backup proxy priority list. Alternatively, the multicast backup TCP sessions 612-1 can be distributed in a multipoint fashion using the individual virtual IP addresses assigned to each resilient TCP proxy module.

Having received the multicast backup TCP sessions 612-1, TCP proxy modules 602-2 through 602-N store the TCP messaging within their respective network TCP cache modules. Correspondingly, other resilient TCP proxy modules 602-2 through 602-N perform the same operation for their active TCP sessions, and therefore resilient TCP proxy module 602-1 receives multicast backup TCP sessions 612-2 through 612-N from other TCP proxy modules. In this example, data source device 26-N receives TCP proxy config 601-N from edge computing device 14-N which is providing TCP proxy service for that data source device, and the split TCP session messaging, including pre-failure client TCP connection 620-N and pre-failure server TCP connection 621-N, are distributed as multicast backup TCP sessions 612-N.

Having received multicast backup TCP sessions 612-2 through 612-N, resilient TCP proxy module 602-1 stores the TCP session messaging in network TCP cache module 606 in preparation for having to provide failover service at some point in the future. When TCP sessions close, the cache associated with that TCP connection within network TCP cache modules 606 of resilient TCP proxy modules 602-2 through 602-N can be cleared. In this way, only active TCP sessions would require persistent caching, reducing storage requirements.

In continuation of the example, failover control modules 608 within resilient TCP proxy modules 602-1 through 602-N consistently transmit heartbeats 614-(1-N) messages to each other as an indication of proper operational status. The heartbeats 614-(1-N) messages can be distributed using the same multicast IP addresses used for multicast backup TCP sessions 612-(1-N), or a separate IP multicast address can be used. In another approach, the heartbeats 614-(1-N) messages can be distributed in a multipoint fashion.

When resilient TCP proxy module 602-1 incurs a failure, heartbeat 614-1 messages will no longer be distributed by the failed proxy module to resilient TCP proxy modules 602-2 through 602-N. When resilient TCP proxy modules 602-2 through 602-N have not received a heartbeat 614-1 message within a set time interval, the respective failover control module 608 within resilient TCP proxy module 602-2 through 602-N examine the backup proxy priority list to determine the highest priority resilient TCP proxy module which heartbeat messages indicate remains operational.

In this example, resilient TCP proxy module 602-2 is the next operational proxy module on the backup priority list. Having become the new serving TCP proxy module for failed resilient TCP proxy module 602-1, resilient TCP proxy module 602-2 becomes master of the virtual IP address for resilient TCP proxy module 602-1 and begins to service the TCP sessions of the failed proxy module. Starting failover service includes transferring the TCP sessions associated with resilient TCP proxy module 602-1 that have been stored in the network TCP cache module of resilient TCP proxy module 602-2 into its TCP proxy module.

With that transfer, the split TCP connections now become post-failure client TCP connection 622-1 between data source device 26-1 and resilient TCP proxy module 602-2, and post-failure server TCP connection 623-1 between resilient TCP proxy module 602-2 and user computing device 18-1. This solution enables persistent TCP connections from the perspective of the data source device 26-1 and the user computing device 18-1 as all session state and TCP messaging is intact and the transition to the backup resilient TCP proxy module 602-2 appears seamless.

FIG. 7B is a logic diagram of an embodiment of a method for maintaining persistent TCP proxy connections with multicast distribution of TCP session messaging. In particular, a method is presented for use in conjunction with one or more functions and features described in conjunction with FIGS. 1-4, 6, and FIG. 7A.

The method includes step 1220 where a current serving edge node, of a plurality of edge nodes, performing a TCP forwarding proxy function, publishes session status information, utilizing a multicast group address, to a subset of the plurality of edge nodes. The plurality of edge nodes have capability to provide a backup TCP forwarding proxy function for one or more data devices communicating messages, via one or more TCP sessions, with one or more cloud services.

The session status information includes, for each TCP session, a current serving edge node operational state, a TCP session operational state, and one or more messages associated with the TCP session. The plurality of edge nodes communicate the messages utilizing the multicast group address.

The publishing of session status information includes issuing a virtual IP address for performing proxy functions with data devices and cloud services, and which is assigned to the serving TCP forwarding proxy as master and to backup TCP forwarding proxies. The publishing of session status information further includes issuing a multicast IP address to be utilized by all serving and backup TCP forwarding proxies for exchanging TCP session operational state, TCP messaging, and edge node operational status.

In a first approach, the serving edge node (i.e., serving TCP forwarding proxy) issues the virtual IP address and multicast IP address to backup TCP proxies. In a second approach, a network management or proxy management system issues the virtual IP address and multicast IP address to the serving TCP forwarding proxy and backup TCP proxies.

The publishing of session status information further includes the serving TCP forwarding proxy and each backup TCP forwarding proxy joining the multicast IP address to form a multicast group. The publishing of session status information further includes distributing to the multicast group, by the current serving TCP forwarding proxy, a copy of the TCP messaging for each active TCP session associated with its TCP forwarding proxy function.

The publishing of session status information further includes distributing to the multicast group by the current serving TCP forwarding proxy, an operational status notification (i.e., indicating the proxy is functional) at a regular interval. In some cases the distributing is only when no TCP session messaging has been distributed to the multicast group within that regular interval.

As an alternative to utilizing multicast IP addresses, separate unicast IP addresses, assigned to each backup TCP forwarding proxy, may be utilized in a multipoint fashion (i.e., one copy sent to each unicast address) for distribution of the session status information. The publishing of session status information further includes receiving and storing, by the backup TCP proxies, the TCP session messaging and operational status notifications from the serving TCP forwarding proxy.

The method continues at step 1222, where the current serving edge node, utilizing the multicast group address, issues updated session status information to this subset of the plurality of edge nodes where the updated session status information includes, for each edge node of the subset of the plurality of edge nodes, an edge node identifier in a backup priority level. The issuing of updated session status information includes assigning edge node identifiers to the subset of edge nodes providing backup TCP forwarding proxy functions and assigning a priority level to each edge node identifier indicative of the order for which the backup TCP forwarding proxy should assume the role of serving TCP forwarding proxy in the event of a failure of the current serving TCP forwarding proxy.

The issuing of updated session status information further includes generating a backup TCP forwarding proxy priority list that indicates the edge node identifiers and backup priority level for each backup TCP forwarding proxy. The issuing of updated session status information further includes distributing to the multicast group the backup TCP forwarding proxy priority list. The issuing of updated session status information further includes receiving and storing the backup TCP forwarding proxy priority list in each edge node providing a backup TCP forwarding proxy function.

The method continues at step 1224, where a next edge node detects an unfavorable current serving edge node operational state, where the next edge node is associated with a most favorable backup priority level of the backup priority levels of the updated session status information. The detecting of an unfavorable current serving edge node operational state (i.e., TCP messaging) may include the absence of receiving either any TCP session operational state, or any edge node operational state notification from the current serving edge node (i.e., current serving TCP forwarding proxy) within a time interval.

As an example, a timer of a fixed duration may be reset upon receiving of either TCP session operational state or edge node operational state, and the expiration of the timer would indicate detection of an unfavorable current serving edge node operational state. The detecting of an unfavorable current serving edge node operational state may further include receiving of an edge node operational state notification from the serving TCP forwarding proxy that indicates the edge node or its TCP forwarding proxy function is in a marginal operational state.

The method continues at step 1226, where the next edge node provides the backup TCP forwarding proxy function, where the backup TCP forwarding proxy function includes the next edge node serving as the current serving edge node. The providing of the backup TCP forwarding proxy function includes first determining that the next edge node is the highest priority backup TCP proxy of the subset of edge nodes capable of providing backup TCP forwarding proxy function that remain in a favorable operational state.

The determining that the next edge node is the highest priority backup TCP proxy includes comparing the stored operational state of the other edge nodes in the backup TCP forwarding proxy priority list and having the highest priority level of those that are in a favorable operational state. The providing of the backup TCP forwarding proxy function further includes the next edge node becoming master of the virtual IP address assigned to the failing TCP forwarding proxy, and notifying the backup TCP forwarding proxies of such utilizing the multicast group address for distribution of the notification.

The providing of the backup TCP forwarding proxy function further includes the next edge node retrieving the stored TCP session operational state and TCP messaging associated with all active TCP sessions of the failing TCP forwarding proxy. The next edge node continues those TCP session operations from their current state.

The method described above in conjunction with the devices and/or modules can alternatively be performed by other modules of the proprietary network 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the proprietary network 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to"

indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   receiving, by a computing entity, a plurality of sets of data streams from a plurality of local networks, wherein each local network of the plurality of local networks is affiliated with a set of data source devices, wherein a data source device of the set of data source devices aggregates and packetizes a set of raw data elements into a corresponding one of the plurality of sets of data streams in accordance with a corresponding aggregating and packetizing protocol;
   de-aggregating and de-packetizing, by the computing entity, the plurality of sets of data streams in accordance with corresponding aggregating and packetizing protocols of the plurality of sets of data source devices to recover a plurality of sets of sets of raw data elements;
   for a user computing device, selecting, by the computing entity, a group of raw data elements from the plurality of sets of sets of raw data elements in accordance with client data selection criteria;
   aggregating and packetizing, by the computing entity, the group of raw data elements in accordance with a network aggregating and packetizing protocol to produce a client data packet; and
   transmitting, by the computing entity, the client data packet to the user computing device.

2. The method of claim 1 further comprises:
   obtaining, by the data source device, communication efficiency information, wherein the communication efficiency information is associated with utilization of the client data packet by the user computing device; and
   adjusting, by the data source device, the corresponding aggregating and packetizing protocol in accordance with the communication efficiency information to include one or more of:
      aggregating less of subsequently received raw data elements into a further corresponding one of the plurality of sets of data streams when the communication efficiency information indicates an unfavorable data communication delay; and
      packetizing subsequently aggregated raw data elements more often into the further corresponding one of the plurality of sets of data streams when the communication efficiency information indicates the unfavorable data communication delay.

3. The method of claim 1 further comprises:
   obtaining, by the computing entity, communication efficiency information, wherein the communication efficiency information is associated with utilization of the client data packet by the user computing device; and
   adjusting, by the computing entity, the network aggregating and packetizing protocol in accordance with the communication efficiency information to include one or more of:
      aggregating less of subsequently selected raw data elements into a subsequent group of raw data elements when the communication efficiency information indicates an unfavorable data communication delay; and
      packetizing subsequently aggregated groups of raw data elements more often into subsequent client data packets when the communication efficiency information indicates the unfavorable data communication delay.

4. The method of claim 1, wherein the selecting the group of raw data elements from the plurality of sets of sets of raw data elements in accordance with client data selection criteria comprises one or more of:
   interpreting a request from the user computing device to identify the group of raw data elements; and
   selecting a raw data element of the group of raw data elements based on a data type of the raw data element and an affiliation between the user computing device and the data type.

5. The method of claim 1, wherein the aggregating and packetizing the group of raw data elements in accordance with the network aggregating and packetizing protocol to produce the client data packet comprises:
   selecting a corresponding portion of each raw data element of the group of raw data elements in accordance with the network aggregating and packetizing protocol; and
   generating the client data packet to include the selected corresponding portions of each of the raw data elements of the group of raw data elements.

6. The method of claim 1, wherein the transmitting the client data packet to the user computing device comprises:
   identifying another computing entity associated with the user computing device; and
   sending, via the other computing entity, the client data packet to the user computing device.

7. A computing device comprises:
   an interface;
   a local memory; and a processing module operably coupled to the interface and the local memory, wherein the processing module functions to:
  receive, via the interface, a plurality of sets of data streams from a plurality of local networks, wherein each local network of the plurality of local networks is affiliated with a set of data source devices, wherein a data source device of the set of data source devices aggregates and packetizes a set of raw data elements into a corresponding one of the plurality of sets of data streams in accordance with a corresponding aggregating and packetizing protocol;
  de-aggregate and de-packetize the plurality of sets of data streams in accordance with corresponding aggregating and packetizing protocols of the plurality of sets of data source devices to recover a plurality of sets of sets of raw data elements;
  for a user computing device, select a group of raw data elements from the plurality of sets of sets of raw data elements in accordance with client data selection criteria;
  aggregate and packetize the group of raw data elements in accordance with a network aggregating and packetizing protocol to produce a client data packet; and
  transmit, via the interface, the client data packet to the user computing device.

8. The computing device of claim 7, wherein the processing module further functions to:
  obtain communication efficiency information, wherein the communication efficiency information is associated with utilization of the client data packet by the user computing device; and
  adjust the corresponding aggregating and packetizing protocol in accordance with the communication efficiency information to include one or more of:
    aggregating less of subsequently received raw data elements into a further corresponding one of the plurality of sets of data streams when the communication efficiency information indicates an unfavorable data communication delay; and
    packetizing subsequently aggregated raw data elements more often into the further corresponding one of the plurality of sets of data streams when the communication efficiency information indicates the unfavorable data communication delay.

9. The computing device of claim 7, wherein the processing module further functions to:
  obtain communication efficiency information, wherein the communication efficiency information is associated with utilization of the client data packet by the user computing device; and
  adjust the network aggregating and packetizing protocol in accordance with the communication efficiency information to include one or more of:
    aggregating less of subsequently selected raw data elements into a subsequent group of raw data elements when the communication efficiency information indicates an unfavorable data communication delay; and
    packetizing subsequently aggregated groups of raw data elements more often into subsequent client data packets when the communication efficiency information indicates the unfavorable data communication delay.

10. The computing device of claim 7, wherein the processing module functions to select the group of raw data elements from the plurality of sets of sets of raw data elements in accordance with client data selection criteria by one or more of:
  interpreting a request from the user computing device to identify the group of raw data elements; and
  selecting a raw data element of the group of raw data elements based on a data type of the raw data element and an affiliation between the user computing device and the data type.

11. The computing device of claim 7, wherein the processing module functions to aggregate and packetize the group of raw data elements in accordance with the network aggregating and packetizing protocol to produce the client data packet by:
  selecting a corresponding portion of each raw data element of the group of raw data elements in accordance with the network aggregating and packetizing protocol; and
  generating the client data packet to include the selected corresponding portions of each of the raw data elements of the group of raw data elements.

12. The computing device of claim 7, wherein the processing module functions to transmit the client data packet to the user computing device by:
  identifying another computing entity associated with the user computing device; and
  sending, via the interface and the other computing entity, the client data packet to the user computing device.

13. A computer readable memory comprises:
  a first memory element that stores operational instructions that, when executed by a processing module, causes the processing module to:
    receive a plurality of sets of data streams from a plurality of local networks, wherein each local network of the plurality of local networks is affiliated with a set of data source devices, wherein a data source device of the set of data source devices aggregates and packetizes a set of raw data elements into a corresponding one of the plurality of sets of data streams in accordance with a corresponding aggregating and packetizing protocol;
  a second memory element that stores operational instructions that, when executed by the processing module, causes the processing module to:
    de-aggregate and de-packetize the plurality of sets of data streams in accordance with corresponding aggregating and packetizing protocols of the plurality of sets of data source devices to recover a plurality of sets of sets of raw data elements;
  a third memory element that stores operational instructions that, when executed by the processing module, causes the processing module to:
    for a user computing device, select a group of raw data elements from the plurality of sets of sets of raw data elements in accordance with client data selection criteria;
  a fourth memory element that stores operational instructions that, when executed by the processing module, causes the processing module to:
    aggregate and packetize the group of raw data elements in accordance with a network aggregating and packetizing protocol to produce a client data packet; and
  a fifth memory element that stores operational instructions that, when executed by the processing module, causes the processing module to:
    transmit the client data packet to the user computing device.

14. The computer readable memory of claim 13 further comprises:
- a sixth memory element that stores operational instructions that, when executed by the processing module, causes the processing module to:
  - obtain communication efficiency information, wherein the communication efficiency information is associated with utilization of the client data packet by the user computing device; and
  - adjust the corresponding aggregating and packetizing protocol in accordance with the communication efficiency information to include one or more of:
    - aggregating less of subsequently received raw data elements into a further corresponding one of the plurality of sets of data streams when the communication efficiency information indicates an unfavorable data communication delay; and
    - packetizing subsequently aggregated raw data elements more often into the further corresponding one of the plurality of sets of data streams when the communication efficiency information indicates the unfavorable data communication delay.

15. The computer readable memory of claim 13 further comprises:
- a seventh memory element that stores operational instructions that, when executed by the processing module, causes the processing module to:
  - obtain communication efficiency information, wherein the communication efficiency information is associated with utilization of the client data packet by the user computing device; and
  - adjust the network aggregating and packetizing protocol in accordance with the communication efficiency information to include one or more of:
    - aggregating less of subsequently selected raw data elements into a subsequent group of raw data elements when the communication efficiency information indicates an unfavorable data communication delay; and
    - packetizing subsequently aggregated groups of raw data elements more often into subsequent client data packets when the communication efficiency information indicates the unfavorable data communication delay.

16. The computer readable memory of claim 13, wherein the processing module functions to execute the operational instructions stored by the third memory element to cause the processing module to select the group of raw data elements from the plurality of sets of sets of raw data elements in accordance with client data selection criteria by one or more of:
- interpreting a request from the user computing device to identify the group of raw data elements; and
- selecting a raw data element of the group of raw data elements based on a data type of the raw data element and an affiliation between the user computing device and the data type.

17. The computer readable memory of claim 13, wherein the processing module functions to execute the operational instructions stored by the fourth memory element to cause the processing module to aggregate and packetize the group of raw data elements in accordance with the network aggregating and packetizing protocol to produce the client data packet by:
- selecting a corresponding portion of each raw data element of the group of raw data elements in accordance with the network aggregating and packetizing protocol; and
- generating the client data packet to include the selected corresponding portions of each of the raw data elements of the group of raw data elements.

18. The computer readable memory of claim 13, wherein the processing module functions to execute the operational instructions stored by the fifth memory element to cause the processing module to transmit the client data packet to the user computing device by:
- identifying another computing entity associated with the user computing device; and
- sending, via the other computing entity, the client data packet to the user computing device.

* * * * *